United States Patent

Bard

[15] 3,702,904

[45] Nov. 14, 1972

[54] SIGNAL COUNTER

[72] Inventor: Jackson F. Bard, 8655 Belford Ave., Apt. 49, Los Angeles, Calif. 90045

[22] Filed: Nov. 5, 1970

[21] Appl. No.: 87,104

[52] U.S. Cl. ................................179/2 A, 179/84 R
[51] Int. Cl. .............................................H04m 1/26
[58] Field of Search .....179/2 A, 5.3, 6 E, 84 R, 81 R

[56] References Cited

UNITED STATES PATENTS

| | | | |
|---|---|---|---|
| 3,360,777 | 12/1967 | Kolm | 179/2 A |
| 3,324,245 | 6/1967 | Stenhammar | 179/5.5 |
| 3,548,102 | 12/1970 | Schaum | 179/2 A |

*Primary Examiner*—William C. Cooper
*Assistant Examiner*—William A. Helvestine
*Attorney*—Nienow & Frater

[57] ABSTRACT

A system for recognizing coded signals, such as telephone ring signals, which have a uniform duration and interval between successive signals which includes an apparatus for providing a signal corresponding to each ring or sub-signal together with one or more control signals whose start times and durations are related to the duration and spacing of the ring signals or sub-signals. The ring signals and the control signals are made to operate logic circuitry which actuates switches when the ring signals conform to a prearranged code. The switches operate display units or perform control functions. The logic system between the signal generation portion of the apparatus and the control switches can have a number of degrees of complexity and the embodiment selected for detailed description includes three logic systems which are operated simultaneously and which incorporate different degrees of complexity. All three systems include a counter and decoders to activate switches in accordance with the number of counts that are made. They also include a control circuitry which initiates counting and prevents counting in accordance with a predefined plan so that the system response to a more complex code of ring signals.

14 Claims, 11 Drawing Figures

INVENTOR
JACKSON E. BARD
BY
Nienow & Frater
ATTORNEYS

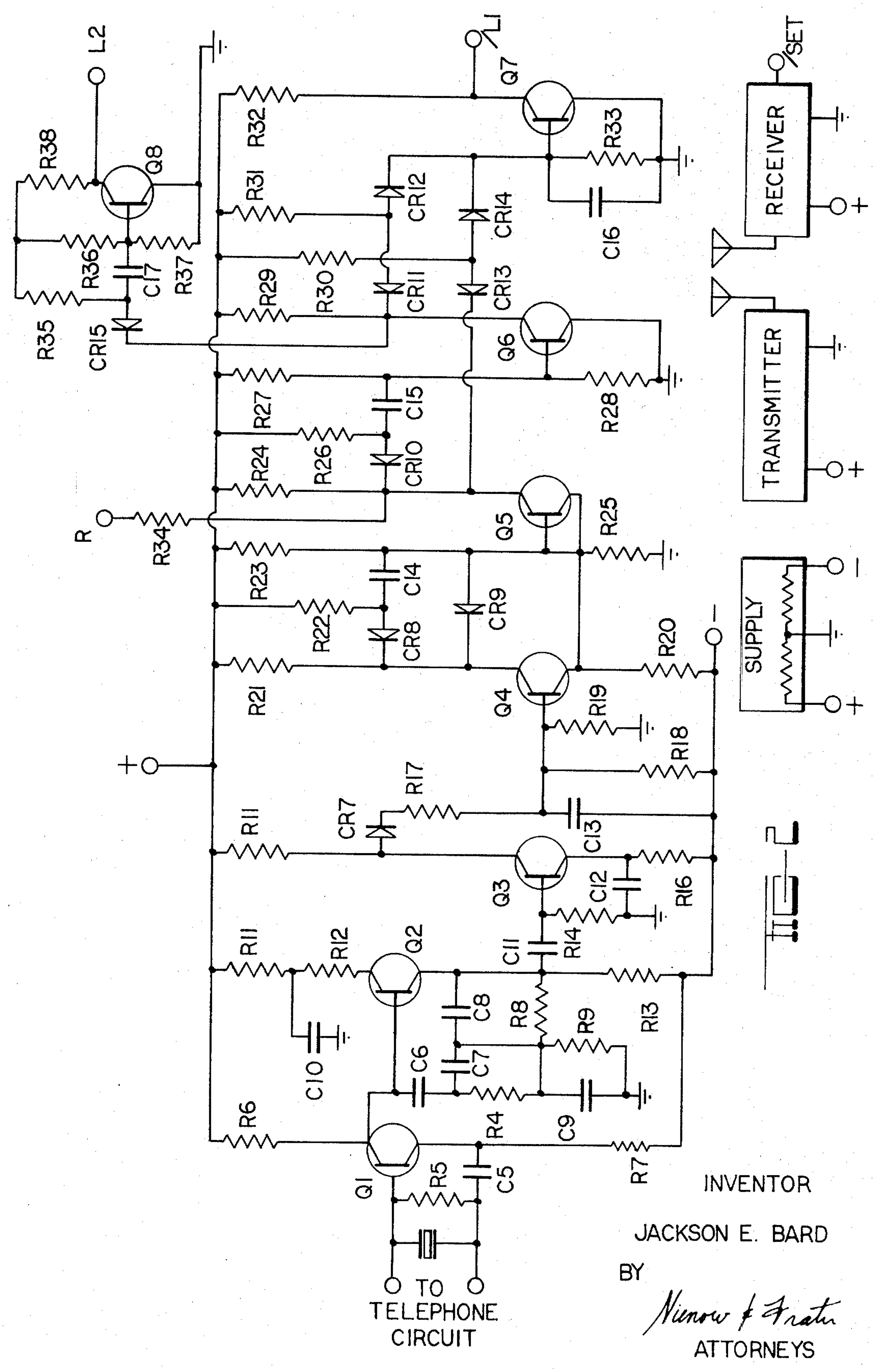
INVENTOR
JACKSON E. BARD
BY
Nienow & Frater
ATTORNEYS

INVENTOR
JACKSON E. BARD
BY
Nienow & Frater
ATTORNEYS

INVENTOR
JACKSON E. BARD
BY
Nimow & Frater
ATTORNEYS

INVENTOR
JACKSON E. BARD
BY
Nienow & Frater
ATTORNEYS

SIGNAL COUNTER

This invention relates to improvements in systems for recognizing coded signals. More particularly it relates to improvements in systems which can recognize codes comprising signals formed by one or more groups of sub-signals where the sub-signals have given duration and a given interval between the starting time of successive sub-signals. The rings of a telephone are examples of signals of that kind. Upon placement of a telephone call, a telephone is made to ring and the caller can control the number of rings at the receiving telephone by ending the call at an appropriate time. The telephone rings are timed so that they have a predetermined duration and so that the interval between calls is fixed. Stated another way, a telephone call comprises rings of given duration and there is a given time interval between the starting time of successive rings.

The telephone system is not the only one that produces signals having that characteristic. Nonetheless, it is by far the most common and widespread of those systems. Accordingly, the embodiment selected for illustration relates to a telephone system. For the sake of clarity the terminology used to describe the invention is generally limited to telephone systems, it being understood, however, that the terms are capable of broader interpretation to embrace other systems having that characteristic.

There are a number of circumstances in which it is desirable to be able to use the telephone system to record and convey information notwithstanding that there is no one at the receiving telephone when that information is to be conveyed. Thus, for example, it may be desired to perform control functions at a distant point through the medium of the telephone system. It may be desired to use the telephone system to leave messages for a night watchman at an unmanned telephone while he is making his rounds. It may be desired to provide a means by which the telephone system can be used by repairmen and salesmen to leave messages at an unmanned telephone station. There are many such applications. It is an object of the invention to provide a means by which messages may be left at an unmanned telephone station to serve these functions and a wide variety of others. Another object is to provide a relatively inexpensive and reliable adjunct to the telephone system which permits that system to be used to leave messages at an unmanned telephone station.

The system provided by the invention is adapted for direct electrical connection to the telephone system. However, it is capable of serving as an adjunct to the telephone system without such direct connection, and therefore without the need to accommodate electrical interaction, by making it responsive to the audible telephone ring signal or to the magnetic field that is generated when the telephone is made to ring. In this connection, it is an object of the invention to provide a unit that can interpret telephone ring codes without a need for direct electrical connection to the telephone system.

These and other objects and advantages of the invention which will hereinafter appear are made possible in the invention by the combination with a signal which is directly indicative of the fact of a telephone ring, of one or more control signals which have a predetermined starting time and time duration relationship to the telephone ring. These elements are coupled with elements which respond to those signals and have a logical interrelationship that enables them to recognize predefined combinations of ring signals.

In the drawings:

FIG. 2 is a diagram, partly schematic and partly diagrammatic, of a means for generating ring signals and control signals upon the occasion of a telephone ring;

THE PREFERRED EMBODIMENT

Figure 1:
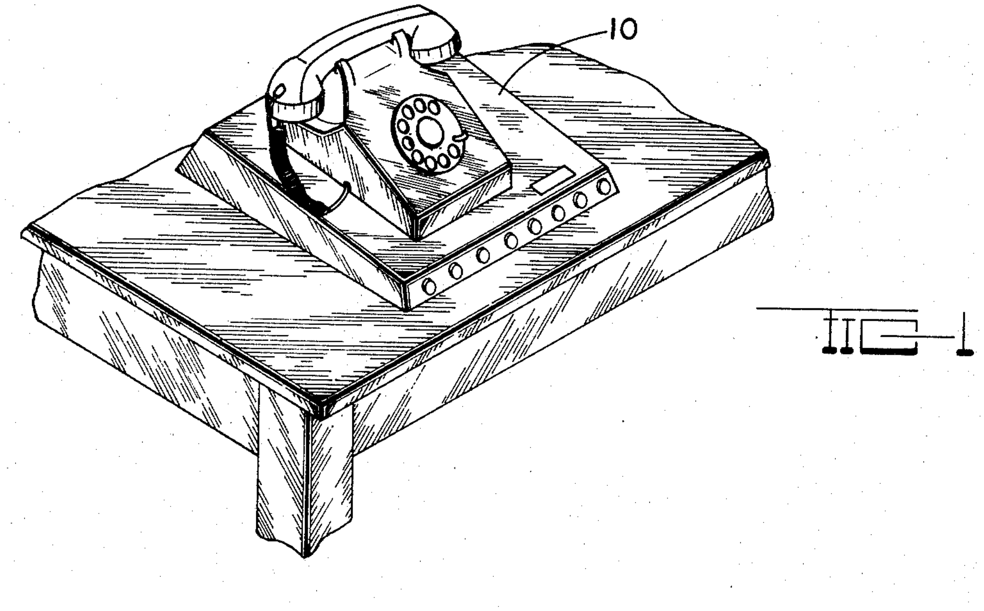
FIG. 1 is a pictorial view of a telephone transmitter and receiver associated with a code recognition system embodying the invention.

The preferred embodiment of the invention is housed in a single cabinet which can be conveniently associated with a telephone instrument. It is shown in FIG. 1 to comprise a generally rectangular case 10, stylized somewhat to enhance its aesthetic quality, and arranged with a low profile and flat upper surface so that it can serve as a base or pedestal for the instrument. The unit includes a means to sense each ring of the telephone. It also includes a means for counting the telephone rings and a means for providing a control or display function in accordance with the number of rings counted. The counting and control means may have any of a number of degrees of complexity. To facilitate understanding of the invention, three orders of complexity have been identified and labeled A, B and C, respectively. A type A system is one which will activate one of a number of display or control units, depending upon the number of times the telephone is permitted to ring during a call. Once the type A system energizes a display or control unit, it is rendered inoperative until manually reset. A type B system is arranged so that it is rendered active by a first telephone call followed within a prescribed time by a second telephone call. The type B system is capable of energizing one of several displays, depending upon how many times the telephone is permitted to ring in the second call.

The type C system is more sophisticated and is able to activate its display or control devices only if two or more telephone calls follow one another within a prescribed period and providing that the first call and second calls comprise some predefined number of rings. Moreover, the C type system may be one arranged to count the individual rings in a series of telephone calls greater than two and to activate any one of a large number of display or control units depending upon a predefined code involving different numbers of rings in the several calls.

The embodiment of the invention selected for illustration includes a means to sense a telephone ring, means for processing the telephone ring signals, and all three types of systems A, B and C. In addition, the embodiment selected for illustration includes a special display unit arranged, in this case, to display the telephone number of the caller. Further, the unit illustrated includes a special proximity detector for guarding against inadvertent satisfaction of a ring code by someone picking up the receiver during a call.

Although the finished device is a unitary instrument, it is best understood by considering it to be a composite of the functional units described above. Each of these units will be discussed in turn.

The means for sensing ringing of the telephones can have a number of forms. That means can include a microphone arranged to provide an electrical output signal whenever the telephone rings. It could comprise a magnetic pick-up responsive to current flow within the telephone as an incident to ringing of the phone, to provide an output signal. These means can provide an input signal for an apparatus of the invention without direct connection to the telephone. A number of other possibilities will occur to persons skilled in the art when direct connection to the instrument is desired and possible.

The output of the sensor is furnished to a ring signal processor which furnishes three output signals. The first of these is called a ring signal R. In this embodiment, that ring signal is a positive going pulse of predetermined amplitude which continues for the duration of the telephone ring but not less than some predetermined time. Another of the outputs is a negative going pulse labeled /L1. It begins at a time shortly after initiation of the ring pulse R and it ends at a fixed time longer than the period between successive rings of a call. It appears at the /L1 terminal which is normally positive but which is reduced to ground potential for the period of the /L1 pulse. The third output signal of the ring signal processor is a positive going pulse L2 which appears at the L2 terminal. It begins shortly after the start of the /L1 pulse and continues for a fixed period of time much longer than the period between rings. The /L1 signal is useful for controlling the device in the interval between the successive rings of a telephone call and for rendering it inoperative if a succeeding ring is not received within a selected time period. The L2 signal continues for a time, such for example as 30 seconds. It maintains the system active to process a second telephone call should a call be received within that 30 second period.

While the ring signal processor can have a number of alternative specific forms, one of those forms is considered to be particularly advantageous for use in the invention and it is illustrated in FIG. 2. Much of the processor is devoted to circuitry by which to reject spurious input ring signals.

RING SIGNAL PROCESSOR

Turning to FIG. 2, the output from the audio or electrical telephone ring signal detector M is applied to the base of transistor Q1 which, together with resistors R5, R6 and R7 and capacitor C5, form a wide band amplifier. After amplification in Q1, the signal is applied to the base of transistor Q2 which is the active element of a high gain amplifier. The amplifier load includes a notch filter tuned to pass only those signals that correspond to the input signal which is indicative of the telephone ring. The amplifier is formed by transistor Q2 and resistors R11, R12 and R13, capacitor C10 and a notch filter. The filter is conventional and is formed by resistors R8, R9 and R10 and capacitors C7, C8 and C9. Signals of other than the tuned frequency result in a feedback signal from the collector to the base of Q2 which reduces the amplitude of those spurious signals. The output from that amplifier, which occurs at desired frequency, is coupled by capacitor C11 to the base of transistor Q3 which, together with resistors R14, R15 and R16 and a capacitor C12, forms a high gain limiting amplifier which is biased sufficiently so that positive excursions of the input signal have no effect on its output. The negative signal excursions on the base of Q3 cause a shift in transistor operation from saturation at zero input, or more positive signal, to cut off in the negative input signal condition. Resistors R15 and R16 are selected so as to cause the anode of diode CR7 to be biased negatively with respect to its cathode during periods when transistor Q3 is saturated. When the base of transistor Q3 is made negative, the transistor Q3 amplifier approaches cut-off and raises the bias on the anode of diode CR7 so that it is positive with respect to the cathode. Thereupon, diode CR7 becomes conductive and charges capacitor C13 through resistor R17. These elements, together with associated resistors R18 and R19, form an integrating network. When a signal has been received for a sufficient period, capacitor C13 will have been charged sufficiently to turn on the transistor Q4. Thus, transistor Q4 is rendered conductive after a time delay determined by the values of resistor R17 and capacitor C13.

Transistor Q4 and transistor Q5 cooperate with resistors R20, R21, R22, R23, R24 and R25, capacitor C14, and diodes CR8 and CR9 to form a pulse shaping amplifier. Transistor Q4 is normally biased off and transistor Q5 is normally biased on. The collector of Q4 is normally positive and the collector of Q5 is normally negative. The emitters of these transistors are connected to a common point. The bias from the base to the emitter of transistor Q4 is negative. When an input signal is detected, the base of transistor Q4 is driven positive after a time delay. It then turns on, causing its collector to become negative, whereupon diode CR8 is rendered conductive and the voltage on the positive side of capacitor C14 becomes negative. The change in voltage across this capacitor is coupled to the base of transistor Q5 where it renders the base negative and causes the transistor to switch off. When transistor Q5 turns off, its collector switches from negative to positive. Capacitor 14 begins to charge toward positive through resistor R23 and after a certain time interval, determined by the values of capacitor C14 and resistor R23, capacitor C14 will again bias transistor Q5 to the on condition. However, if the input signal is still present, transistor Q4 will remain on and the charging capacitor will not be allowed to turn transistor Q5 on. This is because of the action of diode CR9 which is forward biased while the transistor Q4 is turned on. Also, when transistor Q4 is turned on, the base of Q5 is negative and this transistor will remain off. When the input signal stops, transistor Q4 turns off and the base of transistor Q5 changes potential enough to turn on transistor Q5.

Summarizing, an input signal will cause the output of transistor Q5 to switch from a negative value to a positive value. Its positive condition will continue for the duration of the input signal or for the duration of time determined by the value of resistor R23 and capacitor C14, whichever is longer. At the end of this time period, transistor Q5 will again switch to a negative state. The output of that transistor is supplied through resistor R34 to the output terminal R. The pulse that appears at this point is the ring pulse R.

The ring signal is used to generate the /L1 and L2 signals. When transistor Q5 switches from negative to positive, diode CR10 is back biased and capacitor C15 is allowed to charge positive through resistor R26. At the end of the ring signal pulse, the ring signal terminates and diode CR10 is again forward biased and applies the negative going voltage across resistor 26 through capacitor 15 and applies it to the base of transistor Q6 which is normally biased on by current flow through resistor R27. The collector of transistor Q6 is at ground potential. The negative going voltage across capacitor C15 turns transistor Q6 off whereby its output is switched from ground potential to the positive supply potential. Capacitor C15 then begins to charge. After a time interval, determined by the values of resistor R27 and capacitor C15, it will cause the transistor to return to ground potential. The ring signal pulse and the pulse output from the transistor Q6 stage are applied through diodes CR11, CR12 and CR13 and CR14 to the base of an OR stage or amplifier formed by transistor Q7. Capacitor C16 causes a delay in the switching of transistor Q7 when an input is received. The output of that transistor is normally at positive supply potential but it will switch to ground when either the ring signal or the output of the transistor Q6 one-shot circuit has a positive potential. Consequently, the output of transistor Q7 will switch to ground during the period of the ring signal and it will remain at ground potential through the duration of the one-shot signal from transistor Q6.

Figure 3:
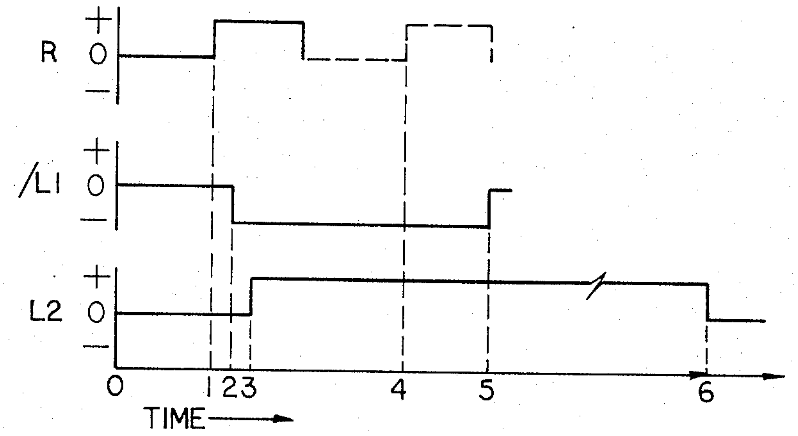
FIG. 3 is a graph showing the time and polarity relationship between the ring signal and the several control signals.

The output of the Q6 one-shot circuit is also coupled to another one-shot circuit which includes diode CR15, resistors 35, 36, 37 and 38, capacitor C17 and transistor Q8. When the output pulse from transistor Q6 terminates, transistor Q8 is turned off and an output signal L2 will be generated at positive supply potential for a period of time determined by the values of resistor R36 and capacitor C17. At the end of this time period, the output of transistor Q8 will again switch back to the ground potential. The pulses are diagrammed in FIG. 3. The upper line depicts one ring pulse. A second pulse is marked in a dashed line to show its time relation to the first ring and the end of the /L1 pulse. The first ring begins at time 1. At time 2 the /L1 signal begins. Shortly after, before the ring ends, L2 begins. The /L1 signal lasts longer than the time 4–1 between rings. Here it ends at time 5, shortly after the next ring would have ended. The time from 5 to the end of L2 and 6 is greater than the time between rings and the period of /L1.

COUNTING AND CONTROL SYSTEMS

Integrated circuits are used in the type A, type B and type C counting and control systems. The complete circuit diagram is unduly complex. It is formed of a number of logic circuits and understanding of the invention and of the circuitry is facilitated by examining the logic diagram rather than the circuit diagram. Here again, a number of variations are possible. The preferred variation has been selected for illustration in the drawing. It includes a number of two and three input, positive, NAND gates such, for example, as Fairchild integrated circuit type SN5400. Reference numeral 100 in FIG. 4 identifies the symbol employed in the diagrams for that element. The NAND gate has two or three inputs and one output; an output appears except when there is a positive input signal at all inputs.

Figures 4, 5, 6, 7:
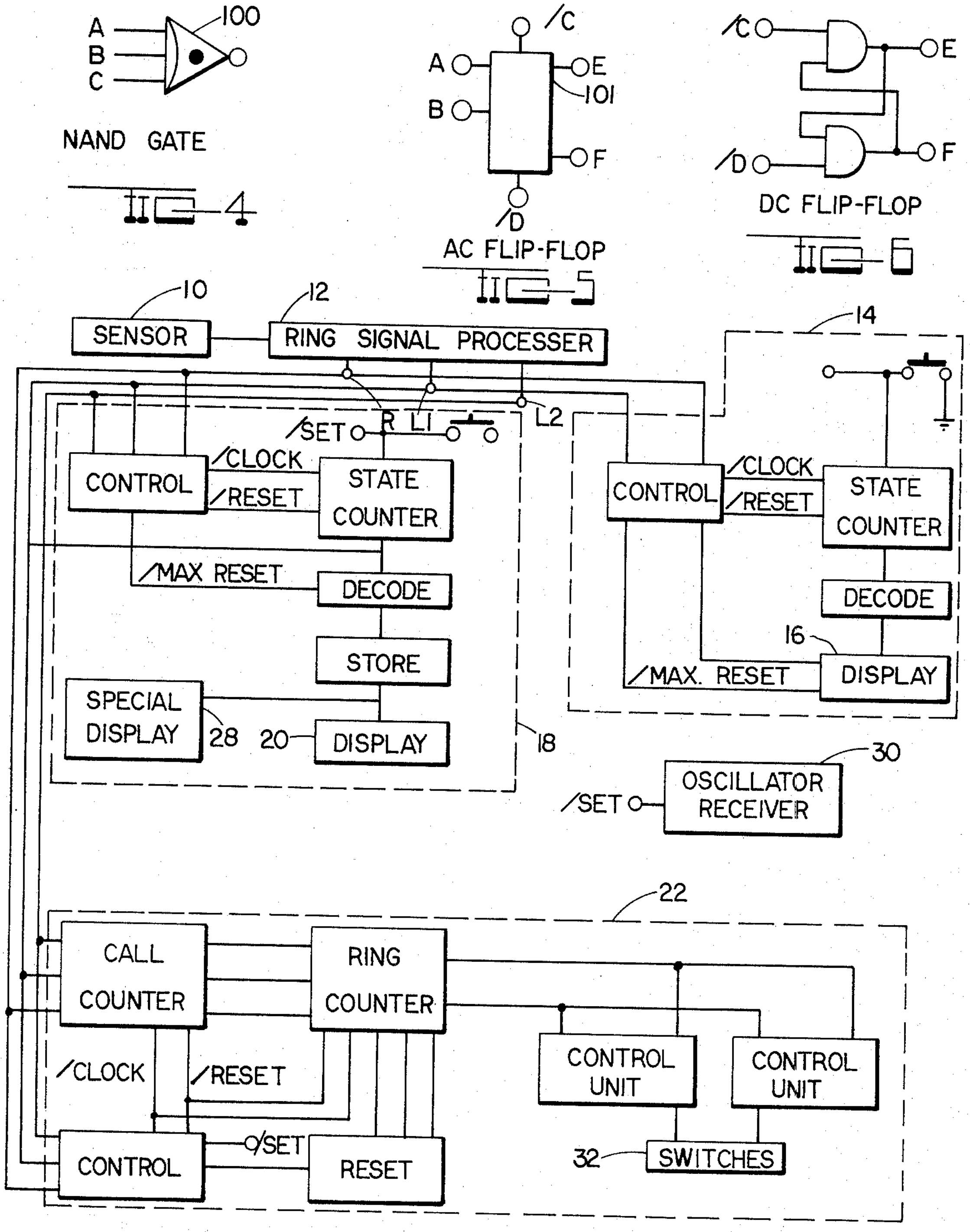
FIGS. 4, 5 and 6 are diagrams of logic elements employed in the invention.
FIG. 7 is a block diagram of a complete system embodying the invention.

AC, edge-triggered flip-flops such as Fairchild type SN5474 are also employed. The symbol for that flip-flop is identified by the reference numeral 101 in FIG. 5. The upper terminal is designated /C. The lower terminal is designated /D. There are two input terminals A and B and two output terminals E and F. When the voltage is applied at the /C terminal and goes to zero, the flip-flop is "set" so that the output at the E terminal is 1 and the output at the F terminal is 0. When the voltage at the /D terminal goes to 0, the flip-flop is "reset" so that the E output becomes 0 and the F output becomes 1. The flip-flop is toggled on the positive edge of a pulse applied at input terminal B. In that case, the unit is reset when the input signal to terminal A is 0 and the unit is set when the input signal at terminal A is 1. The symbol for the DC flip-flop is illustrated in FIG. 6. It has two inputs, /C and /D, and two outputs, E and F. If the /C terminal goes to 0, the unit is set so that the output at E is 1 and the output at F is 0; but if the /D terminal goes to 0, the unit is reset so that the E terminal goes to 0 and the F terminal goes to 1. The DC flip-flop is composed of two AND gates such as Fairchild circuit types SN5400.

BLOCK DIAGRAM OF SYSTEM

A generalized functional diagram of the entire system is illustrated in FIG. 7. It includes a ring signal sensor 10 which in this case is simply a microphone that supplies an output signal while the telephone is ringing. The output of that microphone is applied to the ring signal processor 12 which is shown in FIG. 2 and has been described. The output of that processor comprises one or more of three signals including a ring signal, a /L1 signal and an L2 signal which appear at the ring, /L1, and L2 terminals and lines, respectively. It includes a type A counter and indicator system 14 which is associated with a display 16. It also includes a type B counter and indicator system 18 which is associated with a display 20. In addition, it includes a type C counter and indicator system 22 which is associated with control switches 32. It also includes a proximity detector 30 whose output is a /Set signal which is applied to each of the systems 14, 18 and 22. Finally, the block diagram of FIG. 7 includes a special display unit 28 whose function is to display telephone numbers.

All three of the systems have certain functions in common. Each includes a state counter comprising a counter or a sequencer or a shift register or the like which counts the number of ring signals which appear on the ring line output R of the ring signal processor 12. Each of them contains circuitry which will activate a display or control switches provided that the counter has an electrical state matching the electrical characteristics built into the decoder. Each of the systems includes a means for resetting itself.

TYPE A SYSTEM

Figure 8:
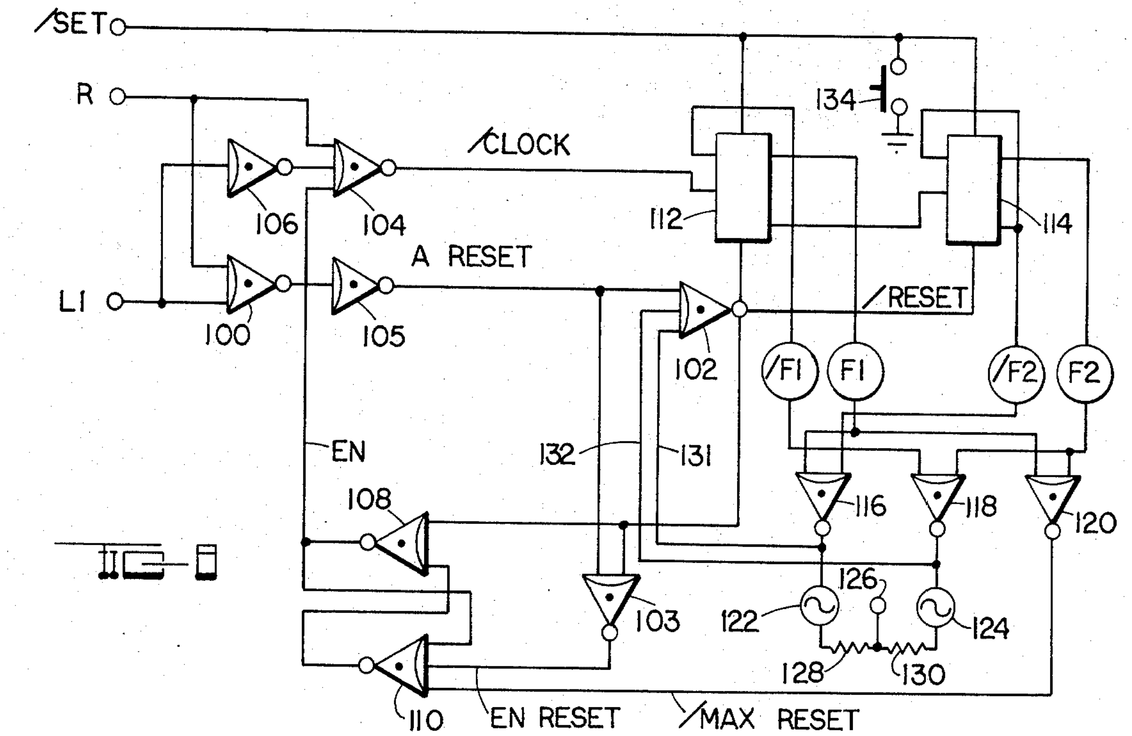
FIGS. 8, 9 and 10 are diagrams of the logic elements of the three kinds of counter and display systems employed in the overall system illustrated in FIG. 7.

A type A counter and display system is shown in FIG. 8. The /SET signal is derived from the proximity sensing unit. The R terminal is the point at which the ring signal is applied to the type A unit and the terminal /L1 is the point at which the /L1 signal is applied to the unit. The control portion comprises NAND gates 100, 102, 103, 104, 105, 106, 108 and 110. Gates 108 and 110 are combined to form a DC flip-flop of the kind that is shown in FIG. 6. The NAND gates are shown in FIG. 4. The counter of FIG. 7 is formed by the two AC flip-flops 112 and 114. These are flip-flops of the kind shown in FIG. 5. The decoder of FIG. 7 comprises three NAND gates 116, 118 and 120. Decoder gates 116 and 118 control a pair of indicators 122 and 124, respectively, which are energized from a power source connected to terminal 126 and from which power is applied to the indicators through limiting resistors 128 and 130.

When the first ring pulse is received by this unit on line R, the L1 line will be at its normal state at the "1" level. NAND gate 100 will be satisfied and will provide an output to NAND gate 105 which is applied by the A RESET line to the NAND gate 102. That signal will satisfy the NAND gate providing that neither of the indicators is energized. This information is applied to NAND gate 102 through the lines 131 and 132 which inhibit the gate if either of the display units 122 or 124 is energized. In the absence of such energization, application of a signal to NAND gate 102 by the A RESET line results in an output signal labeled /RESET. That signal is applied to both of the counter flip-flops 112 and 114 and they are placed in condition to count. At the same time a signal is applied by the A RESET line to NAND gate 103. Another signal is applied by the /RESET line to NAND gates 103 and 108. Those signals do not satisfy gate 103. However, the signal to gate 108 of the flip-flop formed by gates 108 and 110 changes state of that flip-flop so that an enable signal EN appears on the EN line and is applied to gate 104. This is the enabling signal and results in the application of a /CLOCK pulse to the first flip-flop 112 of the counter. A short time following the time of the leading edge of the ring pulse, the /L1 line will go to zero and will remain at that level until a time after the ring is completed. The /L1 line having gone to zero, gate 100 is turned off and the RESET signal is ended. In addition, the gate 104 will be satisfied by a combination of the R signal, the /L1 signal and the EN signal. The /CLOCK line will go to zero. The trailing edge of the clock pulse will turn off the gate 104 and the counter will step to the "1" state. If another ring occurs, the action will be repeated and the counter will step again. At the first step, signals F1 and /F2 will be applied to gate 116. That code turns the gate on so that a display unit 122 will be energized. The outputs of the two counter gates are also applied to decode gates 118 and 120 but in the case of those two gates the applied signals do not have the electrical character required to turn the gates on. If a third ring is received, the counter will again be stepped to a third state in which the gate 120 will be open and gates 116 and 118 are both closed. The output of gate 120 is a signal entitled /MAX RESET which indicates that the counter has stepped to full count. That signal is applied to gate 110 of the flip-flop formed by that gate and gate 108. The flip-flop will be reset and will apply a signal on the EN line that will inhibit gate 104 from applying any additional /CLOCK pulses to the counter regardless of the presence of a ring signal on the R input terminal.

If the telephone call comprised only one or two rings, then either the gate 116 or 118 will be left open and one of the indicators 122 and 124 will be energized and the corresponding inhibit line 131 or 132 will provide an inhibit signal to gate 102 to prevent resetting of the counter. Subsequent calls which arrive after the L1 signal has terminated will then have no effect upon the unit until the counter is reset manually be depressing the reset button 134.

When one of the indicators (or switches) is energized (or actuated), a signal applied to gate 102 by line 131 or 132 prevents gate operation even when an A RESET signal is applied thereto. In that circumstance, similar signals are applied to gate 103 by the A RESET line which is "1" and the /RESET line which is also "1" so that the gate 103 applies a signal to flip-flop 108–110 to terminate the EN signal and disable the unit until reset by switch 134 or a /SET signal.

TYPE B SYSTEM

Figure 9:
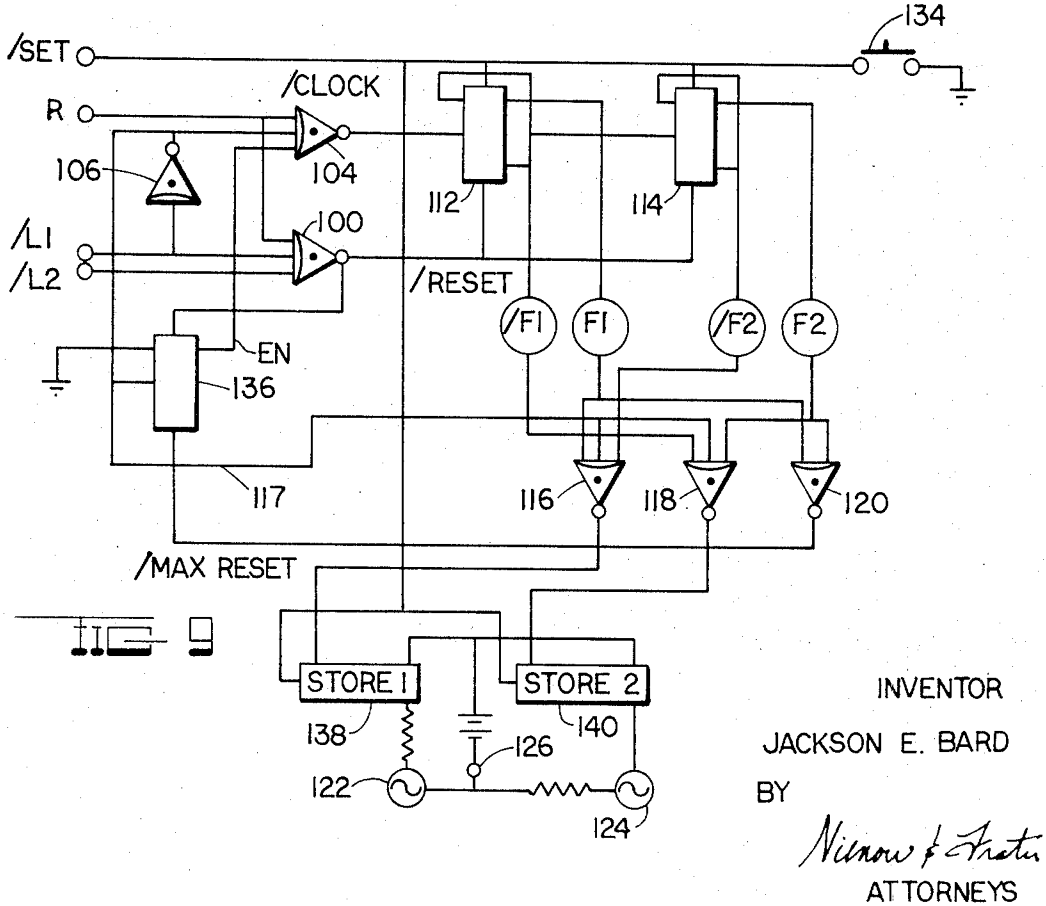

A type B unit is shown in FIG. 9. It is like the type A unit with the following exceptions. A NAND gate 106, storage units STORE 1 and STORE 2, and a line 117 by which the decoders are clocked have been added. The DC flip-flop formed by gates 108 and 110 have been replaced by an AC flip-flop 136. The gates 105, 102 and 103 and the inhibit lines 131 and 132 have been omitted. In the type B unit the energization of an indicator is not made the occasion for making the unit non-responsive to further telephone rings. Instead, when one of the decoder gates 116 and 118 is supplied signals by the counter which opens that gate, the gate output is stored in a storage unit which is arranged to continue energization of one of the indicators until the storage unit is reset by a means other than turning off the gate which supplies input signals to it. In particular, a telephone call comprising a single ring would result in stepping of the counter so that gate 116 was opened and the other two gates 118 and 120 were closed. The result would be the application of an input signal to the STORE 1 unit 138.

That information would not have been stored in unit 138 if a second ring was received prior to expiration of the /L1 input. This is accomplished by setting the gate 116 at the trailing edge of the /L1 pulse which is applied by line 117. If the call continued to a second ring the /L1 signal would not have terminated, gate 116 would not have been satisfied, the information would not have been clocked into STORE 1 and no switching or indication would result. Instead, information would be stored in unit 140, the STORE 2 unit, if the call, and thus the /L1 signal, were to end after two rings. The second switch or indicator would be energized. A third ring in the same call would turn off decode gates 116 and 118 and would turn on decode gate 120 to apply a /MAX RESET signal to the reset line of AC flip-flop 136. That would have the effect of inhibiting the /CLOCK signal gate 104 notwithstanding that additional ring signals were applied to terminal R. Consequently, in this arrangement of decode and storage devices, the unit is not rendered inoperative when one of the indicators is lighted. Instead, the output of the first two decode gates is stored and used to maintain the display units energized notwithstanding that the count is changed and the initiating decode unit is disabled.

In addition, the type B unit is arranged so that the counters are operated only by a telephone call which precedes a previous call by not less than some prescribed time which is here assumed to be 30 seconds. That time is selected only because it was assumed above that the L2 signal from the ring signal processor lasts for 30 seconds after the last ring of a telephone call. It is recalled that the ring signal and the L2 signal are positive going pulses. The /L1 signal is a negative going pulse. The /L1 signal begins shortly after the ring signal begins and the L2 signal begins shortly after the L1 signal begins. The /L1 signal lasts longer than the time between successive rings. Therefore, there is no time during a first telephone call, which is not placed within 30 seconds after a preceding call, when the /L1 and L2 lines are both positive. Accordingly, NAND gate 100 does not pass the ring signal to provide a /RESET signal to the flip-flop 136 during the initial telephone call. The enable signal from flip-flop 136 is not sent to the NAND gate 104 during the initial telephone call so that the /CLOCK signal is not applied to the counter. Consequently, the type B counter and decoder unit is not activated during the first telephone call. However, if a second call is placed so that the telephone rings with an interval not longer than 30 seconds after the preceding call and not shorter than the time in which the /L1 signal is turned off in the preceding call, then when the second ring occurs it will apply a positive signal to the gate 100. The L2 signal will still be positive from the preceding call and, for a short interval of time following the initiation of the ring, the L1 signal will still be positive. All three inputs to gate 100 being positive, the /RESET signal appears at its output and the counter gates 112 and 114 are reset and the AC flip-flop 136 is set so that the positive EN signal is applied to gate 104 along with the positive R signal and the L1 signal which is inverted in gate 106 so that it is positive. That results in a /CLOCK signal at the output of gate 104. Operation from that point on has been described above.

TYPE C SYSTEM

Figure 10:
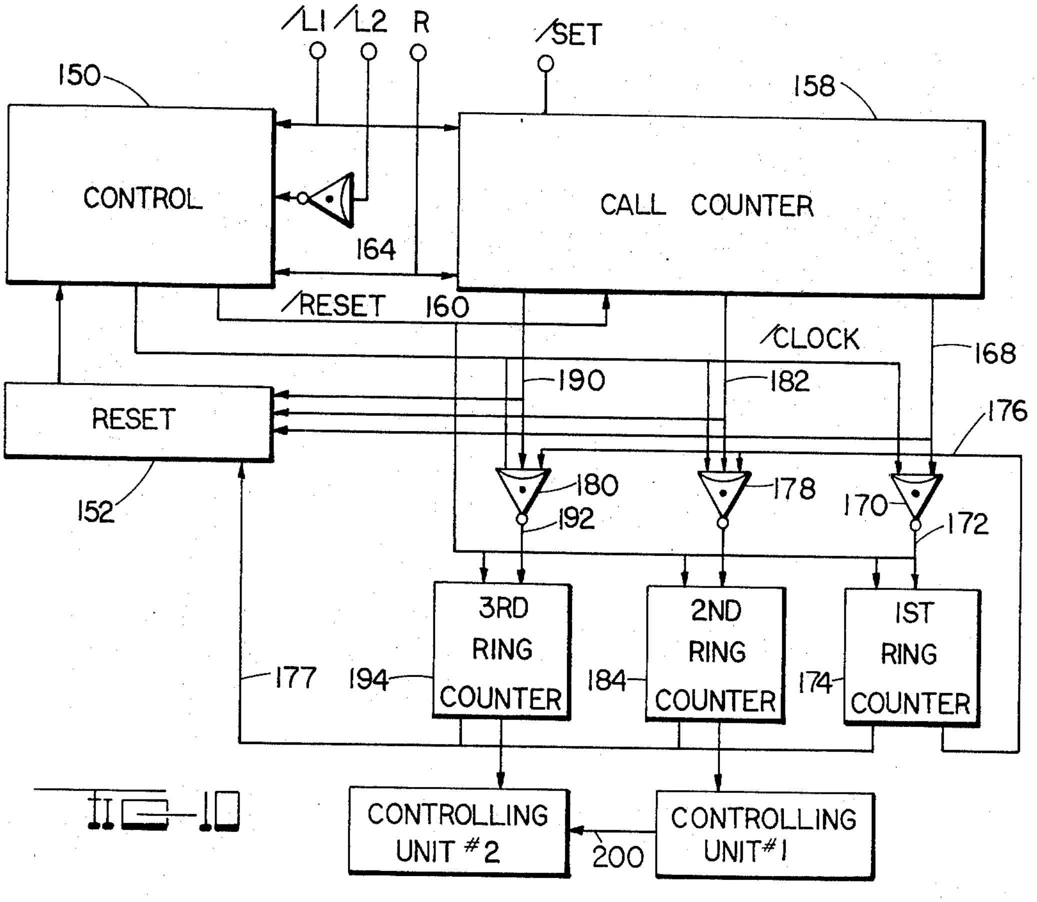
Figure 11:
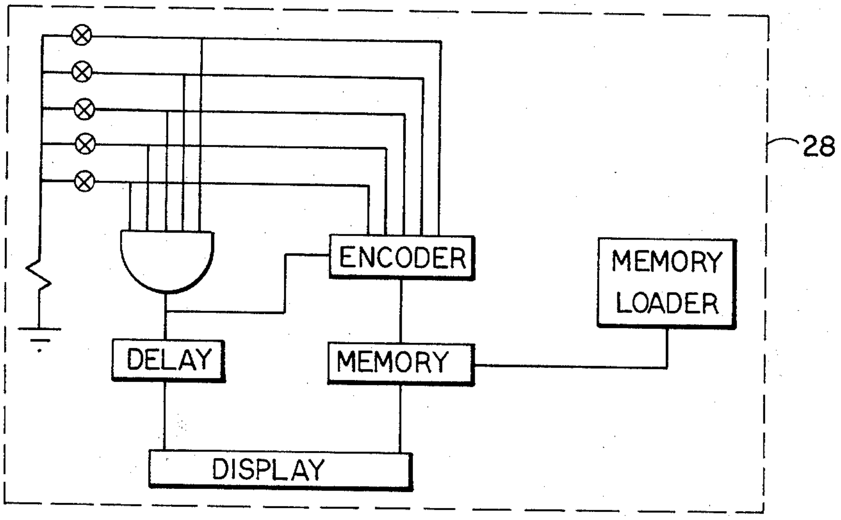
FIG. 11 is a diagram of the special telephone numbered display unit which forms a part of the system illustrated in FIG. 7.

The type C unit is like the type B unit with several exceptions. The control that generates the /CLOCK and /RESET pulse is the same except that it is shown in a block labeled 150 in the diagram of FIG. 10. The AC flip-flop 152 that applies the enable signal to the control is like the flip-flop 136 of FIG. 9 with the exception that it is arranged so that it can be reset by an additional number of inputs and it is also assumed to include a decoder unit corresponding to a decoder 120 of FIG. 9 by which a maximum reset signal is applied to the flip-flop. The other decoder units and their associated storage and indicator units also have counterparts in the type C unit. They are designated controlling unit 1 and controlling unit 2. The counter of the type B system also has a counterpart in the type C system shown in FIG. 10. In that figure it is the call counter 158. It is arranged so that it is clocked and reset in much the same fashion as the counter of FIG. 8. However, its function is to count calls rather than rings. A NAND gate 164 inverts the L2 signal to the control 150 allowing /RESET only on the first ring of the first call. The call counter is reset at the beginning of a new series of calls and will continue counting as long as L2 continues unless it is disabled by violation of the code.

Like the counter of FIG. 9, counter 158 has four output lines. Those lines, by the way that they are energized, activate three ring counters in succession. When the first telephone call has been received by counter 158, the energization of its common terminal 166 and terminal 168 is such that a NAND gate 170 is opened to apply an enabling signal by a line 172 to a first ring counter 174 which counts the number of rings in the first telephone call. On the occasion of the first ring, an allow signal is applied by line 176 to each of gates 178 and 180. These are NAND gates having an input connected to the common line and each having another input connected to a respectively associated one of the other outputs of the call counter. If a second ring is received in the first telephone call, the allow signal on line 176 is terminated and a set signal is applied by line 177 to the RESET unit 152 which then sends a signal to the control unit to prevent generation of the /CLOCK signal and to shut down the unit and render it inoperative.

However, if only one ring was received in the first telephone call so that the allow signal is applied by line 176 to the NAND gates 178 and 180 which apply enabling signals to the second ring counter and the third ring counter respectively, then the unit will respond to a second telephone call provided that it occurs before the expiration of the L2 signal that was occasioned by the initial call. When the second call is received, the call counter 158 is stepped and an enabling signal is applied by line 182 to gate 178. The /CLOCK signal from the control 150 is also applied to that gate and results in the generation of a clock signal which is applied by line 182 to the second ring counter 184. That counter is arranged, just as is the counter formed by flip-flops 112 and 114 of FIG. 9, so that it will step three times; the first time to apply a signal that will satisfy one decode unit in the controlling unit No. 1 and the second time so that it will satisfy a second decode unit in the controlling unit No. 1. At the third step, the output condition satisfies the decoder within the RESET unit 152 that applies a maximum reset signal to toggle the unit. Thus, the controlling unit No. 1 in this embodiment recognizes one ring in a second call or two rings. A signal corresponding to the number of rings is applied by line 200 to controlling unit No. 2. If the second telephone call comprised three or more telephone rings, then a signal was sent to the RESET unit 152 that applied a signal to the control 150 that shut down the unit and made it non-responsive to further telephone ringing until after the elapse of 30 seconds when the L2 signal input would have ended. If the second telephone call included only one or two rings, then the unit is not shut down but it will respond to a third telephone call if that call is placed prior to the expiration of the L2 signal remaining after expiration of the second call. If the third call is received, the call counter 158 will again be stepped. It will apply an enable signal on its output line 190 which is connected to the NAND gate 180. The allow signal is still applied by line 176 to that gate so that the /CLOCK signal at the output of control 150 is applied to that gate 180 so that a clock signal appears at the gate output on line 192. That signal serves as a clock signal for the third ring counter 194. The operation of the third call counter from that point on is exactly like that of the second call counter.

Since the third ring counter, like the second, is assumed to be capable of counting only two rings before sending a signal on line 177 to reset unit 152, the controlling unit No. 2, like controlling unit No. 1, need distinguish only two states. However, it is also supplied with a signal on line 200 from controlling unit No. 1. That signal can be used to divert the output of controlling unit No. 2 to either of two pairs of output (switch or indicator circuits) circuits or it can be used to determine the state at one of two output circuits selected in controlling unit No. 2. The latter arrangement is actually incorporated in the embodiment depicted in the drawings. Controlling unit No. 2 selects one of two control circuits according to the count received from the third counter. The signal from line 200 determines whether the selected control circuit will be energized or not energized. In another model, controlling unit No. 2 controls two pairs of switches. The pairs are designated 1 and 2 and the switches of each pair are designated A and B. The second controlling unit selects pair 1 or 2 and the signal on the line corresponding to line 200 selects the A or B switch.

The specific example selected for illustration here includes counter units that can be stepped three times and are effective at the third step to render the unit inoperative. The three step counter was selected only because three steps are the minimum number on which a full explanation of the systems could be based. It is to be understood that the counters can be arranged so that the number of counts can be increased or decreased. In that case, the number of decoders and of indicator units or switch units would be changed. In this connection, it is clear that the indicators 122 and 124 could just as easily comprise electric switches or both indicators and switches. Accordingly, the terms "indicator" and "switch" are interchangeable and indicator equals switch.

I claim:

1. In a system for recognizing coded telephone signals comprising ring signals of given duration and given interval between the start time of successive ring signals within a call, in combination:

control signal means for generating a first control signal beginning at a given time during a ring signal and continuing, following the corresponding given time of the last ring of a call, longer than said interval;

counting means sensitive to said ring signals for counting them; and output means for providing an output signal indicative of the number of rings counted;

said counting means being rendered operative to begin counting by a ring signal only in the absence of a first control signal.

2. In a system for recognizing coded telephone signals comprising ring signals of given duration and given interval between the start time of successive ring signals within a call, in combination:

control signal means for generating a first control signal beginning at a given time during a ring signal and continuing, following the corresponding given time of the last ring of a call, longer than said interval;

counting means sensitive to said ring signals for counting them; and output means for providing an output signal indicative of the number of rings counted;

said counting means being rendered operative to begin counting by a ring signal only in the absence of a first control signal;

said counting means comprising a digital counter and a resetting means for resetting said counter to zero count; and said output means comprising disabling means for rendering both said resetting means and said counting means inoperative.

3. The invention defined in claim 2 in which said system is housed in at least one container and which further comprises means for rendering said disabling means inoperative when a person is positioned proximately to said container.

4. In a system for recognizing coded telephone signals comprising ring signals of given duration and given interval between the start time of successive ring signals within a call, in combination:

control signal means for generating a first control signal beginning at a given time during a ring signal and continuing, following the corresponding given time of the last ring of a call, longer than said interval;

counting means sensitive to said ring signals for counting them; and output means for providing an output signal indicative of the number of rings counted;

said counting means being rendered operative to begin counting by a ring signal only in the absence of a first control signal;

said counting means comprising a digital counter responsive to reset signals to reset itself to an initial count and responsive to clock signals to change its count; and a pair of gates connected to said counter, one gate of which is responsive to ring signals occurring during the existence of a first control signal to supply a clock signal to said counter only following furnishing of a reset signal to said counter, and the other gate of which is responsive to ring signals to supply a reset signal to said counter in the absence of a first control signal.

5. The invention defined in claim 4 which further comprises means for rendering said one gate inoperative to provide a clock signal upon the occasion first to occur of:

counting by the counter beyond a selected number; and provision of said output signal.

6. The invention defined in claim 4 including means for rendering said one gate effective to furnish a signal, and for rendering said other gate ineffective to furnish a signal, when the first control signal has one polarity, and for rendering said one gate ineffective to furnish a signal, and said other gate effective to furnish a signal, when said first control signal has an opposite polarity.

7. The invention defined in claim 1 which further comprises a means for providing a second control signal beginning at a time during a ring which is subsequent to commencement of said first control signal and which ends at a time after the termination of said first signal;

said counting means being rendered operative to begin counting by a ring signal only if one of said first and second control signals is provided and the other is not provided.

8. In a system for recognizing coded telephone signals comprising ring signals of given duration and given interval between the start time of successive ring signals within a call, in combination:

control signal means for generating a first control signal beginning at a given time during a ring signal and continuing, following the corresponding given time of the last ring of a call, longer than said interval;

counting means sensitive to said ring signals for counting them; and output means for providing an output signal indicative of the number of rings counted;

said counting means being rendered operative to begin counting by a ring signal only in the absence of a first control signal;

means for providing a second control signal beginning at a time during a ring which is subsequent to commencement of said first control signal and which ends at a time after the termination of said first signal;

said counting means being rendered operative to begin counting by a ring signal only if one of said first and second control signals is provided and the other is not provided;

said counting means comprising a digital counter having a number of output terminals capable of energization and deenergization in different combinations, each indicative of a different count; and said output means comprising a number of gates having input terminals connected to more than one of said output terminals of said counter and being responsive to provide an output signal in response to a given energization of its input terminals: and a memory means for storing information indicating that the respectively associated gate has been rendered operative.

9. In a system for recognizing codes comprising signals formed by one or more groups of sub-signals having given duration and a given interval between the starting time of successive sub-signals, in combination:

control signal means for generating a first control signal beginning at a given time during a sub-signal and continuing following the corresponding given time during the last sub-signal of a group, longer than said interval;

counting means sensitive to said sub-signals for counting them; and output means for providing an output signal indicative of the number of sub-signals counted;

counter control means for rendering said counting means ineffective to commence counting during continuance of said first control signal.

10. In a system for recognizing codes comprising signals formed by one or more groups of sub-signals having given duration and a given interval between the starting time of successive sub-signals, in combination:

control signal means for generating a first control signal beginning at a given time during a sub-signal and continuing, following the corresponding given time during the last sub-signal of a group, longer than said interval;

counting means sensitive to said sub-signals for counting them; and output means for providing an output signal indicative of the number of sub-signals counted;

counter control means for rendering said counting means ineffective to commence counting during continuance of said first control signal;

said control signal means being effective to generate a second control means being effective to generate a second control signal beginning during a sub-signal subsequent to initiation of said first control signal and continuing for a time following termination of the last sub-signal of a group longer than said interval.

11. The invention defined in claim 10 in which said control signal means is effective to render said counting means effective to commence counting upon the simultaneous occurrence of a sub-signal and said second control signal.

12. In a system for recognizing codes comprising signals formed by one or more groups of sub-signals having given duration and a given interval between the starting time of successive sub-signals, in combination:

control signal means for generating a first control signal beginning at a given time during a sub-signal and continuing, following the corresponding given time during the last sub-signal of a group, longer than said interval;

counting means sensitive to said sub-signals for counting them; and output means for providing an output signal indicative of the number of sub-signals counted;

counter control means for rendering said counting means ineffective to commence counting during continuance of said first control signal;

said counter comprising first and second sub-signal counting means for counting separately, and respectively, the sub-signals of a first sub-signal group and the sub-signals of a second sub-signal group and which further comprises means for counting groups of sub-signals;

said counter control means including means for rendering said means for counting groups of sub-signals inoperative to count any but the first sub-signal of a group; and means for rendering said first and second sub-signal means effective to count sub-signals when the means for counting groups of sub-signals has counted a predetermined number of initial sub-signals.

13. The invention defined in claim 12 in which said output means comprises a plurality of output switches each responsive to one count condition of said first sub-signal counter to assume a state corresponding to the count condition of said second sub-signal counter.

14. The invention defined in claim 13 which further comprises a visual display unit, a memory bank, and means responsive to the state of said output means for displaying information recalled from said memory bank on said visual display unit.

* * * * *